Figure 1:
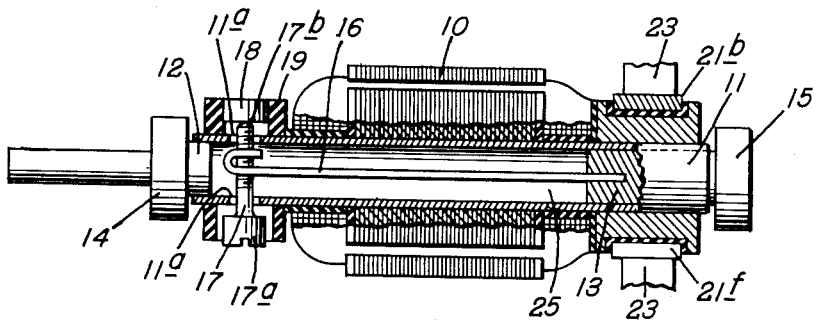

March 13, 1956      K. F. TESH      2,738,391
CIRCUIT AND CENTRIFUGAL SWITCH FOR MOTOR SPEED REGULATION
Filed March 27, 1953

INVENTOR.
K. F. TESH
BY
ATTORNEY

United States Patent Office 2,738,391
Patented Mar. 13, 1956

2,738,391

CIRCUIT AND CENTRIFUGAL SWITCH FOR MOTOR SPEED REGULATION

Kimble Frank Tesh, Santa Monica, Calif., assignor to Bendix Aviation Corporation, North Hollywood, Calif., a corporation of Delaware Application March 27, 1953, Serial No. 345,055

3 Claims. (Cl. 200—80)

This invention relates to motors incorporating centrifugal switches for limiting the speed to a desired constant value and to a centrifugal switch design for use therewith.

An object of the invention is to provide a simple and effective armature assembly incorporating a centrifugal switch.

Another object is to provide a motor armature circuit controlled by a centrifugal switch integral with the armature for regulating the speed of the motor.

Figure 2:
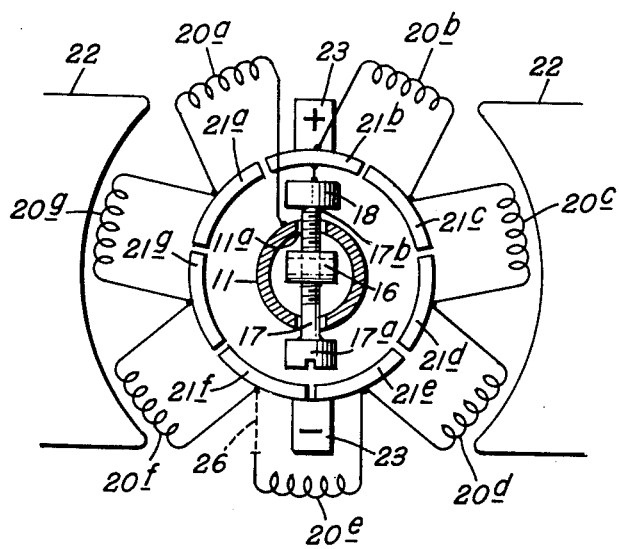

Other more specific objects and features of the invention will appear from the following description with reference to the drawing, in which:

Fig. 1 is a longitudinal section through a motor armature assembly in accordance with the invention; and Fig. 2 is a schematic diagram of the armature circuit.

Referring to Fig. 1, the armature assembly comprises an armature core 10 mounted on a hollow shaft 11 which is secured to stub shafts 12 and 13 at opposite ends, the latter being supported by ball bearings 14 and 15.

A spring reed 16 extends longitudinally within the axial chamber 25 defined by the hollow shaft 11, and is anchored at its right end in the stub shaft 13. At its opposite or free end the reed carries in threaded engagement therewith a screw 17 having a heavy head 17a. The tip 17b of the screw constitutes a first electrical contact and bears against a second contact 18 supported by an insulator 19 from the hollow shaft 11. It will be observed that the head 17a of the screw, and the contact 18, are positioned exterior of the hollow shaft 11, and the latter is provided with diametrically opposite holes 11a for the screw to pass through. The reed 16 is prebowed so that when installed it is stressed to cause the tip of the screw 17 to bear firmly against the contact 18. At high speed, centrifugal force of the screw head 17a, which constitutes a mass element, overcomes the force of the spring reed and opens the first contact, constituted by the tip of the screw, away from the second contact 18.

Referring to Fig. 2, there is shown the conventional diagram for a ring-type armature winding having seven sections 20a to 20g inclusive, connected to commutator segments 21a to 21g respectively. Two field poles 22 and two brushes 23 are shown. Each of the windings 20 may be connected between two successive commutator segments so that a closed circuit is formed through all of the windings in series.

It will be observed that the winding 20a is connected to one of its associated commutator segments 21b through the reed 16, screw 17, and contact 18.

The winding 20e, which is approximately diametrically opposite the winding 20a, may or may not be connected between its associated segments 21e and 21f, as indicated by the dotted connection 26. If the connection 26 is provided, then so long as the first contact 17b lies against the contact 18 all of the armature windings are connected in a closed series circuit and the motor operates in conventional manner in response to energization of the field and application of current to the brushes 23, 23.

When the motor speed becomes high enough to actuate the centrifugal switch and open the first contact 17b from the second contact 18, then the connection is broken between the winding 20a and the commutator segment 21b, and one half of the entire winding is thereby rendered inactive. In the position shown in Fig. 2, the portion of the winding rendered inactive will be windings 20e, 20f, 20g and 20a. As the armature rotates these windings will be rendered active, and other new coils will be rendered active. But so long as the first and second contacts 17b and 18 are opened, not more than half of the armature windings will be active at any one time. This reduces the torque developed by the motor, and if the load on the motor is sufficient the reduction will cause the motor speed to drop to the point where the contacts 17b and 18 again close to energize all of the windings and build the speed up. Dependent upon the sensitivity to changes in speed of the centrifugal switch, the motor will hunt above and below the speed at which the contacts open and close.

If the load on the motor is very low, the cutting out of half the windings may not reduce the torque sufficient to hold the speed down. In such event, the dotted connection 26 can be eliminated so that the winding 20e is permanently opened. With this arrangement, only half of the windings are active when the first and second contacts 17b and 18 are closed, and when those contacts are open all of the windings are inactive. Therefore when the speed rises to the value at which the centrifugal switch opens, substantially all torque is destroyed and the motor quickly drops below the desired speed.

In Fig. 2, the armature is shown as a ring armature because this type of construction is much more easily shown in diagram. However, in actual construction, the armature is preferably drum wound so that a balanced torque is developed in the armature even when less than all of the winding sections are active.

When the connection 26 is opened, half the winding is always inactive, but this is not a very serious disadvantage in many applications. The power output of a motor is limited by the total heat dissipation of the armature and larger current can be tolerated in the active half of the winding than could be tolerated in it if the other half was active.

An advantage of the construction described, aside from its simplicity, is that it provides very close speed regulation.

Another advantage is that there are no electrical connections to the armature except through the usual commutator and brushes.

Another advantage is that the centrifugal switch mechanism is largely self-contained within the armature and is well protected. At the same time, the adjusting screw 17 is easily accessible for adjustment.

The field used with the armature construction described may be of a conventional type. It may be a permanent magnet or it may be an electromagnet energized from the same source as the brushes 23 or from a separate source. When the field winding is energized from the same source as the brushes 23 it may be connected in shunt to or in series with the brushes. In accordance with well established practice, when the series connection is used, the motor can be operated on A. C. as well as D. C.

The speed at which the contacts open is dependent upon the stiffness and unstressed shape of the reed 16, as well as on the weight of the head 17a and its spacing from the axis of rotation. As previously indicated, the reed can be pre-bowed so that it is heavily stressed when in the substantially straight condition of use.

It will be observed that backing the screw 17 out reduces the speed at which the contacts open, because it reduces the stress in the reed 16, and advancing the screw increases the speed because it increases the stress. Since the normal position of the screw is fixed by contact with the fixed contact 18, adjustment of the screw does not alter the radial spacing of the screw head 17a from the axis of rotation and does not alter the centrifugal force developed in the mass element (the screw head). Adjustment therefor does not materially change the balance of the armature assembly. Balance can be obtained initially by suitably choosing the masses of the head 17a and the fixed contact 18 and the length of the screw. Adjustment shifts the reed 16, but it is so light and so near the axis of rotation that it has little effect on the overall balance.

It will be noted that when the connection 26 is open, the winding 20e is always inactive and serves no purpose electrically. It can be omitted without altering the performance of the motor where the connection 26 is to be left open at all times.

Although for the purpose of explaining the invention, a particular embodiment thereof has been shown and described, obvious modifications will occur to a person skilled in the art, and I do not desire to be limited to the exact details shown and described.

I claim:

1. A speed-responsive switch for a rotatable member having a chamber therein including the axis of rotation of the member, comprising: a flat spring reed extending substantially in said axis within said chamber and having secured thereto adjacent one end a first contact facing in one direction of the thickness of the reed and a mass element displaced from the plane of the reed and from the axis of said shaft; means rigidly anchoring the other end of said reed to said rotatable member; and a second stationary contact insulatingly mounted on said rotatable member in alignment with said first contact for making and breaking therewith in response to flexing of said reed; said one contact and said mass element being fixed relative to each other and laterally adjustable as a unit relative to said reed, whereby the distance of said mass element from said axis when said contacts are closed is fixed and independent of the lateral position of adjustment of the mass element relative to the reed.

2. Apparatus according to claim 1 in which said first contact and said mass element are constituted by a headed screw threaded through said reed, the tip of the screw being the said first contact and the head of the screw being the said mass element.

3. Apparatus according to claim 2 in which said rotatable member has opposite radial passages extending from said chamber in alignment with said screw, through which said screw projects, said screw head and said second contact being exterior of said rotatable member.

References Cited in the file of this patent

UNITED STATES PATENTS

| | | |
|---|---|---|
| 397,006 | Kester | Jan. 29, 1889 |
| 1,107,914 | Dean | Aug. 18, 1914 |
| 1,855,703 | Cloud | Apr. 26, 1932 |
| 2,032,444 | Schwarz | Mar. 3, 1936 |
| 2,503,950 | Johnson | Apr. 11, 1950 |
| 2,538,476 | Smith | Jan. 16, 1951 |
| 2,545,715 | Sullivan et al. | Mar. 20, 1951 |

FOREIGN PATENTS

| | | |
|---|---|---|
| 26,695 | Great Britain | of 1910 |